(No Model.) 2 Sheets—Sheet 1.

J. L. FURBY.
SULKY PLOW.

No. 292,426. Patented Jan. 22, 1884.

Witnesses:
E. F. Murdock
Amos Hadley

Inventor:
Jesse L. Furby
By A. Rice
Atty.

(No Model.) 2 Sheets—Sheet 2.
J. L. FURBY.
SULKY PLOW.
No. 292,426. Patented Jan. 22, 1884.
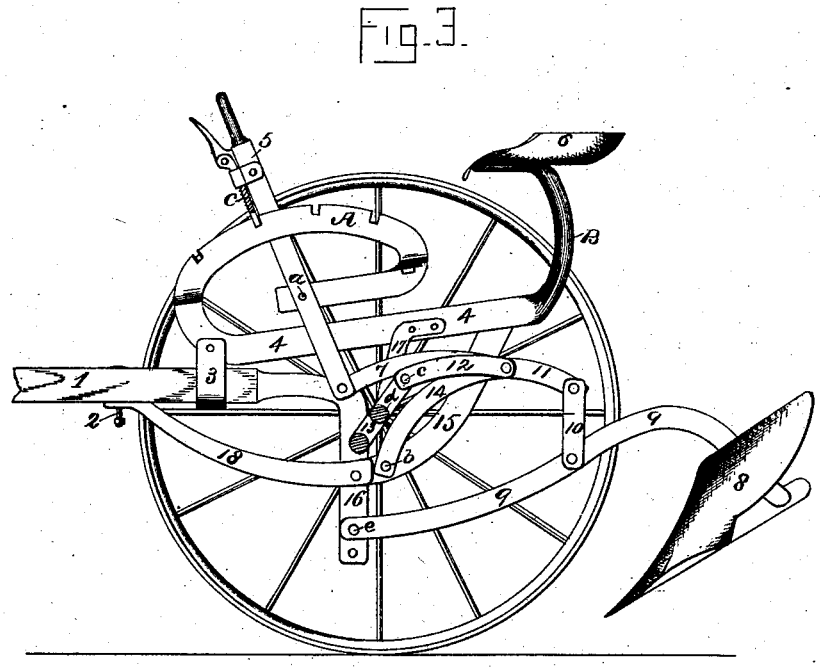
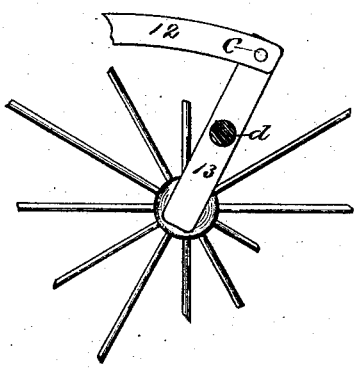

UNITED STATES PATENT OFFICE.

JESSE L. FURBY, OF NASHVILLE, ILLINOIS, ASSIGNOR OF ONE-HALF TO JOHN Y. NELSON, OF SAME PLACE.

SULKY-PLOW.

SPECIFICATION forming part of Letters Patent No. 292,426, dated January 22, 1884.

Application filed November 2, 1883. (No model.)

*To all whom it may concern:*

Be it known that I, JESSE L. FURBY, a citizen of the United States, residing at Nashville, in the county of Washington and State of Illinois, have invented an Improvement in Sulky-Plows, of which the following is a specification.

The object of my invention is to provide a sulky-plow with simple and effective mechanism, by means of which the plow may be easily lifted from or lowered into the furrow, and whereby the draft will be in a line with the pulling-power.

Figure 1:
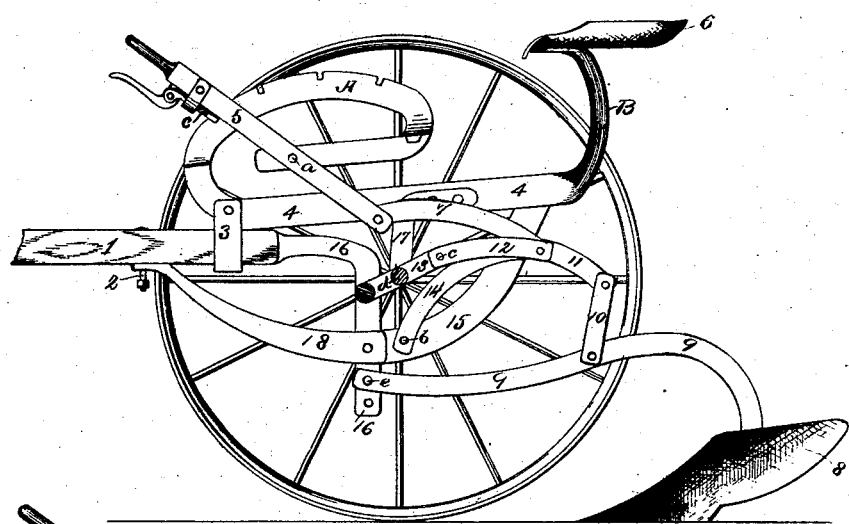
Figure 2:
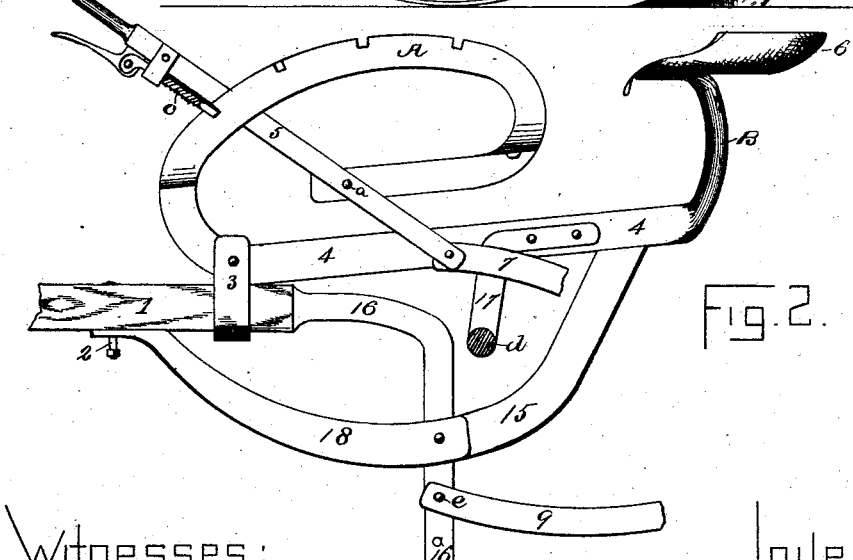

Figure 1 represents a side elevation of my improved sulky-plow with the left or furrow wheel off. Fig. 2 represents a side view of a portion of the plow mechanism. Fig. 3 represents a side elevation of the sulky-plow, showing the plow lifted from the furrow. Fig. 4 represents an inside view of the crank-axle arm fulcrumed on the main axle, and a portion of the link-lever which connects it with the operating mechanism.

Similar letters and figures in the specification and drawings refer to like parts.

In Fig. 1, 4 is the frame, comprising in one piece the catch-bar A and the seat-standard B. 17 is a brace sustaining the frame, and rigidly secured to the main axle. 15 and 18 are braces riveted on either side of the pole-shank 16. Brace 18 is loosely fitted to the pole or tongue 1 at the point where the whiffletree is held, and is kept in place by the bolt, on which said tree swings at 2. Brace 15 is rigidly attached to the pole-shank and to the frame 4, near the base of the seat-standard B. 3 is the tongue-socket, riveted to the frame 4; 16, the pole-shank, with the plow-beam 9 fulcrumed at $e$ thereon. 5 is the lever-bar, with spring-pawl C, and fulcrumed on the frame 4 at $a$. This lever operates to elevate or lower the plow through the connecting-levers 7 11 10, in connection with the lever 14, pivoted at $b$ on the brace 15, and lever 12, pivoted at $c$ on the arm of the crank-axle 13. 9 is the plow-beam, 8 the plow-share, and 6 the seat resting upon the standard B.

In Fig. 2, 4 is the frame, consisting of the segmental catch-bar A and the seat-standard B; 5, the lever-bar, fulcrumed at $a$, and which operates the crank-axle, fulcrumed on the main axle at $d$, and the plow through the connecting-levers shown in Fig. 1.

In Fig. 3 the lever-bar 5 is shown as drawn toward the driver, thereby lifting the plow from the furrow and holding it in an elevated position by the spring-pawl C engaging with the catch-bar A.

In Fig. 4 an inside view is had of the crank-axle arm 13, fulcrumed on the main axle at $d$, and a part of the connecting-lever 12, which connects with the several link-levers, through which the line of the furrow-wheel bearing is shifted and the plow lifted or lowered, as desired. By the double leverage employed in shifting the crank-axle and lifting and lowering the plow, less power is required to move the lever-bar than is usual in sulky-plows as now constructed.

The catch-bar A and seat-standard B, comprising frame 4, are formed in one piece, securing firmness to the foot-rest and durability to the parts named.

A guide-slot for the lever-bar to move in may be formed by riveting to the ends of the catch-bar a side plate, hipped at its ends, so as to admit of the free movement of the lever.

The seat may be bolted or riveted to the top of the seat-standard, and the foot-rests secured to the catch-bar immediately in front of the seat.

The frame 4 is held in a firm position by supporting-arms or braces rigidly attached to the main axle, and by the brace 15, connecting said frame with the pole-shank.

What I claim as new and of my invention, and for which I ask Letters Patent, is—

1. In combination with the plow-beam of a sulky-plow, frame 4, catch-bar A, seat-standard B, lever-bar 5, link-levers 7 11 10 12 14, and crank-axle arm 13, substantially as set forth.

2. In a sulky-plow, in combination with a lever fulcrumed to a catch-bar frame, link-levers 7 11 10 12 14, crank-axle arm 13, plow-beam 9, and pole-shank 16, whereby the crank-axle is shifted and the plow raised or lowered, substantially as set forth and described.

3. In a sulky-plow, the combination of frame 4, consisting of catch-bar A and seat-standard B, lever-bar 5, link-levers 7 11 10 12 14, crank-axle arm 13, braces 15 18, tongue-socket 3, and pole-shank 16, arranged and combined substantially as and for the purposes set forth.

In testimony whereof I have affixed my signature in the presence of two subscribing witnesses.

JESSE L. FURBY.

Witnesses:
 JOHN NELSON,
 H. H. AUGSTORSON.